(12) United States Patent
Wirthl et al.

(10) Patent No.: US 11,541,858 B2
(45) Date of Patent: Jan. 3, 2023

(54) BRAKING SYSTEM FOR TEST VEHICLE

(71) Applicant: Humanetics Austria GmbH, Linz (AT)

(72) Inventors: David Wirthl, Linz (AT); Lukas Proprentner, Linz (AT); Alexander Brennsteiner, Linz (AT); Kyrill Krajoski, Vöcklabruck (AT); Patrick Hofmanninger, Gaspoltshofen (AT)

(73) Assignee: Humanetics Austria GmbH, Linz (AT)

( * ) Notice: Subject to any disclaimer, the term of this patent is extended or adjusted under 35 U.S.C. 154(b) by 208 days.

(21) Appl. No.: 16/994,018

(22) Filed: Aug. 14, 2020

(65) Prior Publication Data
US 2021/0046913 A1  Feb. 18, 2021

Related U.S. Application Data
(60) Provisional application No. 62/886,554, filed on Aug. 14, 2019.

(51) Int. Cl.
 *B60T 8/88* (2006.01)
 *B60T 8/171* (2006.01)
 (Continued)

(52) U.S. Cl.
 CPC ............... *B60T 8/88* (2013.01); *B60T 8/171* (2013.01); *B60T 8/1761* (2013.01);
 (Continued)

(58) Field of Classification Search
 CPC .......... B60T 8/88; B60T 8/171; B60T 8/1761; B60T 13/142; B60T 13/66;
 (Continued)

(56) References Cited

U.S. PATENT DOCUMENTS

| 5,749,633 A | 5/1998 | Baumgartner |
| 8,190,344 B2 * | 5/2012 | Krueger .......... B60W 30/18145 |
| | | 180/65.285 |

(Continued)

FOREIGN PATENT DOCUMENTS

| CN | 107300473 A | 10/2017 |
| CN | 108344586 A | 7/2018 |

(Continued)

OTHER PUBLICATIONS

US 8,706,395 B2, 04/2014, Kelly et al. (withdrawn)
(Continued)

*Primary Examiner* — Mary Cheung
(74) *Attorney, Agent, or Firm* — Howard & Howard Attorneys PLLC

(57) ABSTRACT

An overrunable test vehicle including an electronically-controlled anti-slip braking system for reducing wheel slip during rapid deceleration comprising: a chassis, at least one electric motor connected to a first axle, a hydraulic braking system connected with the chassis and at least a second axle, a rotational speed sensor for determining a rotational speed of a connected axle, a ground speed sensor, and a controller connected with the electric motor, the hydraulic braking system, the rotational speed sensor, and the ground speed sensor. The controller is configured to calculate a difference between the rotational speed of the axle and the ground speed of the chassis to determine a slip threshold of the wheels, actuate the hydraulic brake system to apply a first stopping force, control at least one motor parameter of the electric motor to apply a second stopping force. The first and second stopping forces combined are less than the slip threshold of the wheels such that the chassis rapidly decelerates free of a wheel slip condition.

26 Claims, 14 Drawing Sheets

(51) Int. Cl.
- B60T 8/1761 (2006.01)
- B60T 13/14 (2006.01)
- B60T 13/66 (2006.01)

(52) U.S. Cl.
CPC ............ B60T 13/142 (2013.01); B60T 13/66 (2013.01); *B60T 2250/04* (2013.01)

(58) Field of Classification Search
CPC .. B60T 2250/04; B60T 8/172; B60T 8/17616; B60T 2270/406; B60T 17/221; G01L 5/28; G01M 17/0078; F16D 65/14; F16D 66/00; F16D 2066/005; F16D 2121/04
See application file for complete search history.

(56) References Cited

U.S. PATENT DOCUMENTS

| | | | |
|---|---|---|---|
| 8,428,863 B2 | 4/2013 | Kelly et al. | |
| 8,428,864 B2 | 4/2013 | Kelly et al. | |
| 8,457,877 B2 | 6/2013 | Kelly et al. | |
| 8,583,358 B2 | 11/2013 | Kelly et al. | |
| 8,589,062 B2 | 11/2013 | Kelly et al. | |
| 8,751,143 B2 | 6/2014 | Kelly et al. | |
| 9,182,942 B2 | 11/2015 | Kelly et al. | |
| 9,827,998 B1 | 11/2017 | Kelly | |
| 10,379,007 B2 | 8/2019 | Perrone et al. | |
| 10,830,670 B2 | 11/2020 | Simader et al. | |
| 2014/0039727 A1 | 2/2014 | Kelly et al. | |
| 2014/0045631 A1 | 2/2014 | Kelly et al. | |
| 2018/0257652 A1* | 9/2018 | Mueller | B60W 30/188 |

FOREIGN PATENT DOCUMENTS

| | | | | |
|---|---|---|---|---|
| EP | 2657672 A1 | 10/2013 | | |
| EP | 2660928 A1 | 11/2013 | | |
| EP | 2845777 A1 | 3/2015 | | |
| EP | 2988369 A1 | 2/2016 | | |
| EP | 3 242 120 A1 | 11/2017 | | |
| EP | 3242120 A1 | 11/2017 | | |
| KR | 1 01 97881 7 B1 | 5/2019 | | |
| KR | 101978817 B1 | 5/2019 | | |
| WO | WO-2016015793 A1 * | 2/2016 | ............ | B60T 8/1708 |

OTHER PUBLICATIONS

English language abstract for CN 107300473 A extracted from espacenet com database on Feb. 11, 2021, 1 page.
Computer-generated English language abstract for EP 3 242 120 A1 extracted from espacenet.com database on Feb. 11, 2021, 2 pages.
European Search Report for Application No. EP 20 19 1107 dated Jan. 12, 2021, 2 pages.
Dehghani, Dana, "Optimal Anti-lock Braking System With Regenerative Braking in Hybrid Electric Vehicle", HEV ABS, University of Malaysia, Jun. 2014, 30 pages.
English language abstract for CN 108344586 A extracted from espacenet.com database on Sep. 21, 2020, 1 page.
English language abstract for KR 101978817 B1 extracted from espacenet.com database on Sep. 21, 2020, 2 pages.
English language abstract of Ammon, D., "Modellbildung und Systementwicklung in der Fahrzeugdynamik", ("Modeling and System Development in Vehicle Dynamics"), ISBN: 3-519-02378-4, 1997, 1 page.
EURO NCAP, "AEB Car-to-Car Systems en Test Protocol", https://www.euroncap.com/en/forengineers/, Introduced in 2014, updated in 2020, 3 pages.
Hoffman, G. et al., "Autonomous Automobile Trajectory Tracking for Off-Road Driving: Controller Design, Experimental Validation and Racing", American Control Conference, 2007, 6 pages.
Kaiser, G. et al. "Torque Vectoring With a Feedback and Feed Forward Controller—Applied to a Through the Road Hybrid Electric Vehicle", IEEE Intelligent Vehicles Symposium, Jul. 2011, pp. 448-453.

English language translation of abstract/summary of Matschinsky, W., Radführungen der Straßenfahrzeuge: Kinematik, Elasto-Kinematic und Konstruktion, vol. 3, ("Wheel Guides of Road Vehicles: Kinematics, Rlasto-kinematics and Construction"), Springer Berlin Heidelberg, ISBN: 978-3-540,71196.4, 2007, 1 page.
English language abstract of Obermuller, P., ""Modellbasierte Fahrzustandsschätzung zur Ansteuerung einer aktiven Hinterachskinematik"", ("Model based identification of vehicle handling for controlling vehicle dynamics with rear wheel steering), Technische Universität München, 2012, 1 page."
Description and Table of Contents of Pacejka, H.B. et al., "Tire and Vehicle Dynamics", Third Edition, Butterworth-Heinemann, ISBN 978-08-097016-5, 2012, 9 pages.
English language abstract of Reif, K. "Bremsen und Bremsregelsysteme", ("Brakes and Brake Control Systems"), Vieweg + Teubner, ISBN: 8348-1311-4; 2010, 1 page.
English language abstract of Intoduction of Rothuß, R., "Anwendung derflachheitsbasierten Analyse und Regelung nichtlinearer MehrgröBensysteme, Fortschritt-Berichte VDI Reihe 8, Meß-, SteuerungsundFortschritt-BerichteVDI Reihe 8, Meß-, Steuerungsund Regelungstechnik", (Rothfuss, R., "Application of Flatness-Based Analysis and Control of Non-Linear Multivalue Systems, Progress Reports VDI Series 8, Measurement, Control and Progress Reports VDI Series 8, Measurement, Control and Regulator Technology"), ISBN: 978318366, 1997, Nr. 664, 1 page.
Savitzky, A. et al., "Smoothing and Differentiation of Data by Simplified Least Squares Procedures", Analytical Chemistry, vol. 36.8, 1964, pp. 1627-1639.
English language translsation of Introduction of Schramm, D. et al., ""Modellbildung und Simulation der Dynamik von Kraftfahrzeugen"", (Modeling and Simulation of the Dynamics of Motor Vehicles), Berlin, Springer, ISBN 978354089315, 2010, 2 pages.
Transport Policy, "Vehicle Definitions", https://www.transportpolicy.net/standard/eu-vehicle-definitions/, 2018, 7 pages.
English language translation of Introduction of Vietinghoff, A., "Nichtlineare Regelung von Kraftfahrzeugen in Querdynamisch Kritischen Farsituationen", ("Nonlinear Control of Motor Vehicles in Lateral Dynamics Critical Driving Situations"), Universiatve Karlsruhe, ISBN 9.783866442238, 2008, 1 page.
U.S. Appl. No. 17/677,561, filed Feb. 22, 2022.
English Language abstract and original German language document of HOFMANNIGER, Patrick, "Autonome Regelung eines PKW mit Fahrroboter", Masterabeit, Johannes Kepler Universitat Linz, Jun. 2018, 77 pages.
English Language abstract and original German language document of Proprentner, L. , "Modellierung, Fahrwerkanalyse und Regelung eines Ultraflachen Mobilen Roboters", Masterabeit, Johannes Kepler Universität Linz, Jun. 2018, 80 pages.
Ryan, Jonathan et al., "Tire Radius Determination and Pressure Loss Detection Using GPS and Vehicle Stability Control Sensors", 8th IFAC Symposium on Fault Detection, Supervision and Safey of Technical Processes, Aug. 29-31, 2012, Mexico City, MX, 6 pages.
Partial Machine-Assisted English Translation and original German language document of Schoberl, Markus, "Prozessautomatisierung II, Stand SS 18", 2018, 99 pages.
English language abstract and original German lanuage document for Wirthl, David., "Entwicklung eines Fahrroboters zum Testen von Fahrerassistenz-Systemen", Masterarbeit, Johannes Kepler Universitat Linz, Jun. 2016, 35 pages.
EP 3 242 120 A1, Nov. 8, 2017, U.S. Pat. No. 10,830,670 B2.
Hofmanniger, Patrick, "Autonome Regelung eines PKW mit Fahrroboter", Masterabeit, Johannes Kepler Universitat Linz, 77 pages, Jun. 2018.
Proprentner, L., "Modellierung, Fahrwerkanalyse und Regelung eines Ultraflachen Mobilen Roboters", Masterabeit, Johannes Kepler Universität Linz, 80 pages, Jun. 2018.
Wirthl, David., "Entwicklung eines Fahrroboters zum Testen von Fahrerassistenz-Systemen", Masterarbeit, Johannes Kepler Universität Linz, 85 pages, Jun. 2016.
Schoberl, Markus, "Prozessautomatisierung II, Stand SS 18", 99 pages, 2018, Partial Machine-Assisted English Translation.

* cited by examiner

BRAKING SYSTEM FOR TEST VEHICLE

PRIORITY

The subject application is the claims priority to U.S. Provisional Patent Application No. 62/886,554, filed on Aug. 14, 2019, the contents of which are incorporated herein by reference in their entirety.

TECHNICAL FIELD

This Application generally relates to braking systems for Advanced Crash Avoidance test vehicles, particularly overrunable test vehicles (OTV).

BACKGROUND

With the rise of Advanced Driver Assistant Systems (ADAS) being developed and tested, the need for testing equipment which reduce risk to testing members, while being able to sustain potentially damaging impacts and scenarios has drastically increased. A paramount tool in testing the developing crash avoidance technologies is the use of mobile and controllable platforms. The mobile platforms are adapted to hold a simulated target objects such as an automobile, truck, pedestrian, bicycle, or similar. The simulated target is typically made of a material which will not damage the vehicle equipped with the ADAS, such as foam, cardboard, or any other soft material.

During testing, mobile test platforms may be subjected to sudden or hard braking in order to test the crash avoidance technologies integrated into passenger vehicles. Typically, the brake system on a test vehicle is applied when the master cylinder actuates the closing of the brake caliper onto the brake rotor. The amount of force applied by the brake caliper is monitored through the use of a pressure sensor. However, only the pressure applied is monitored while there is no data on the rotational speed of the wheels. Without measuring the rotational speed of the wheels when the test vehicle is decelerating, it is likely that too much pressure will be applied from the brake caliper against the brake rotor, causing the wheels to lock putting the vehicle into sliding condition.

During deceleration, the tires of a test vehicle may lock causing wheel slip. In some instances, the wheels will lock up and blow out due to the sliding condition. Wheel slip occurs when the force applied to a tire (i.e. braking torque) exceeds the traction available to that tire. Braking torque is the amount of force applied by the brake caliper to the brake rotor, and subsequently onto the wheel and tire. When braking torque is too high, the tires will lock and the vehicle may begin to slide in an unpredictable manner.

It would be attractive to have a braking system which monitored the pressure applied from the brake caliper against the brake rotor, as well as monitoring peripheral wheel speed and chassis speed. It would be attractive to have a brake system which actively monitored the braking force and wheel speed in order to prevent a wheel slip condition.

SUMMARY

The present teachings provide for a braking system that monitors and analyzes the difference between the wheel speed and chassis speed, and calculates an optimum amount of braking force to avoid wheel slipping conditions during deceleration. The braking system applies the optimal force to the wheel via the braking system.

The present teachings provide for an overrunable test vehicle including an electronically-controlled anti-slip braking system for reducing wheel slip during rapid deceleration. The overrunable test vehicle also includes a chassis; a first axle and a second axle rotatably supported by the chassis; a wheel connected to each of the first and second axles; at least one electric motor connected to the first axle; a hydraulic braking system partially supported by the chassis and partially coupled to at least the second axle; a rotational speed sensor connected to at least one of the first and second axles for determining a rotational speed of the connected axle; a ground speed sensor supported by the chassis for determining a ground speed of the chassis; and a controller operatively connected with the at least one electric motor, the hydraulic braking system, the rotational speed sensor, and the ground speed sensor, the controller configured to: calculate a difference between the rotational speed of the axle and the ground speed of the chassis to determine a slip threshold of the wheels; actuate the hydraulic brake system to apply a first stopping force; control at least one motor parameter of the at least one electric motor to apply a second stopping force; where the first and second stopping forces combined are less than the slip threshold of the wheels such that the chassis rapidly decelerates free of a wheel slip condition.

The overrunable test vehicle further provides for where the rotational speed sensor is connected directly to the second axle. A diameter of each wheel is calibrated into the controller so that the controller can calculate wheel speed based on the rotational speed sensor. The hydraulic braking system includes at least one brake rotor mounted to the second axle with a caliper coupled to the chassis. The hydraulic braking system further includes a master cylinder operatively coupled with a brake actuator with the brake actuator actuating the master cylinder to produce the first stopping force applied by the brake caliper to the brake rotor. The brake actuator is connected to the controller. The hydraulic braking system further includes a pressure sensor connected to the controller, where the pressure sensor sends a pressure signal of the first stopping force produced by the master cylinder within the hydraulic brake system to the controller. The second axle, brake caliper, and, brake rotor are mounted at one end of the chassis, and the master cylinder and brake actuator are mounted on an opposite end of the chassis. The braking system includes one calipers for each of the rotors. The overrunable vehicle further including a steering system with the second axle connected to the steering system such that the wheels mounted to the second axle are steerable wheels. The at least one electric motor is further defined as two electric motors with one electric motor connected to each first axle. The overrunable vehicle further including a drive train connected between the electric motor and the first axle. The drive train includes a suspension system including one or more absorbers. The motor parameter is defined as a rotational speed that the electric motor spins. The motor parameter is defined as a torque that the electric motor produces. The motor parameter is defined as two motor parameters with a first parameter being a rotational speed that the electric motor spins and a second parameter being a torque that the electric motor produces. The chassis further includes a suspension system including one or more absorbers. The chassis is segmented into at least two compartments, where a first compartment housing at least the first axle and a second compartment housing at least the second axle. The second compartment is the width of the chassis housing the steering system and the steerable wheels. The second compartment is further separated so that each of the steerable wheels is located in a wheel chamber. The electric motor is two electric motors and the first axle is two first axles, each motor and corresponding axle including a drive train connecting the electric motor and the first axle forming a first drive train and a second drive train; and where the first compartment is divided into at least two chambers, each chamber housing one of the first drive train and second drivetrain. One or more batteries are located between the first compartment and the second compartment in a third compartment between the first compartment and the second compartment.

One aspect of the present teachings include a method for maintaining control of an overrunable test vehicle during high deceleration with the overrunable test vehicle having at least one electric motor. The method also includes determining a ground speed of the overrunable test vehicle; determining a rotational speed of the axle of the overrunable test vehicle, calculating a wheel slip threshold based on the ground speed and the speed of the axle using the controller, actuating a hydraulic braking system to apply a first stopping force which is less than the wheel slip threshold, and controlling one or more motor parameters of one or more electric motors using the controller to apply a second stopping force and to adjust speed and torque that is less than the wheel slip threshold, and concurrently applying the first and second stopping forces to decelerate the overrunnable vehicle free of a wheel slip condition.

Implementations may include one or more of the following features. The method where the step of calculating the wheel slip threshold is further defined as calculating a difference between the rotational speed of the axle and the ground speed. The hydraulic braking system includes at least one brake rotor mounted to an axle with a caliper coupled to a chassis of the overrunable test vehicle, and a master cylinder operatively coupled with a brake actuator with the brake actuator connected to the controller, and the hydraulic braking system further including a pressure sensor connected to the controller, and further including the step of: The method includes sending a pressure signal from the pressure sensor of the first stopping force produced by the master cylinder within the hydraulic brake system to the controller. The method further including the steps of changing an actuation distance of the brake actuator and changing the stopping force applied through the hydraulic braking system using the controller based on the pressure signal of the stopping force.

DETAILED DESCRIPTION

Figure 1:
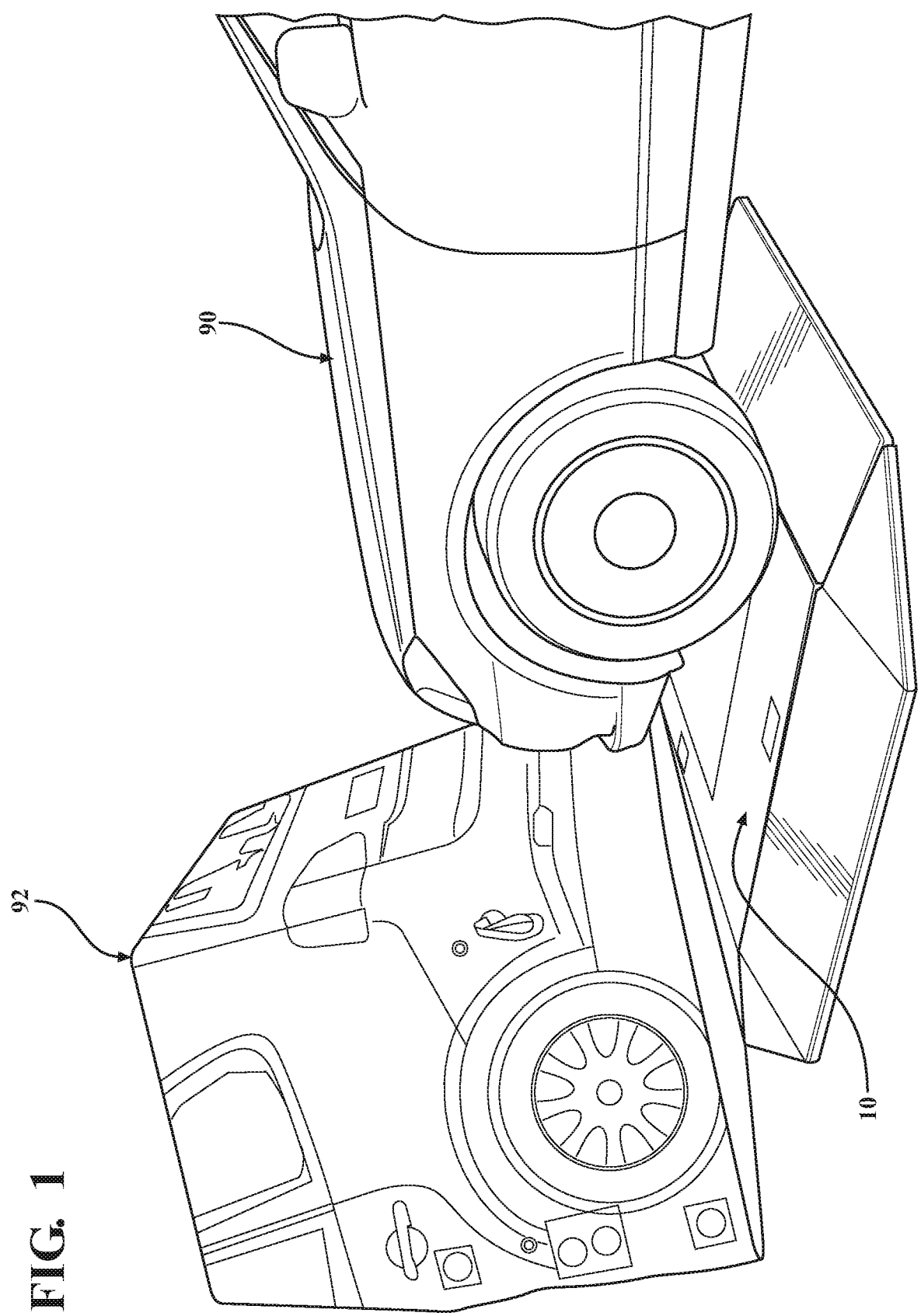
FIG. 1 is a perspective view of an overrunable test vehicle with a soft target being struck by a vehicle.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a test vehicle used in advanced crash avoidance technologies. The test vehicle 10 may function as a mobile and controllable platform for holding a simulated target object 92 such as an automobile, truck, pedestrian, bicycle, or similar. The test vehicle may be an overrunable test vehicle (herein OTV). During crash avoidance testing, the OTV may be subjected to rigorous conditions, including be run over by a vehicle 90 with advanced crash avoidance technologies.

The OTV 10 includes a chassis 12. The chassis 12 may function as the base structure or frame of the test vehicle. The chassis may be made of steel, composite material, plastic, or a combination thereof. The chassis may include a plurality of ramps 22 removably connected with the chassis 12. The chassis 12 may include a removable cover 20. The chassis 12 may be connected with a plurality of wheels 18, one or more suspension systems 40, a steering system 36, a braking system 50, 60, a controller 80, one or more receivers, one or more motors 10, one or more batteries 82, a plurality of sensors (e.g. 24, 56, 64), or a combination thereof.

The chassis 12 may be divided into separate compartments to house the different systems and components of the OTV 10. The compartments may function to separate mechanical systems, electrical systems, power systems, sensors, wheels, braking systems, steering systems, or a combination thereof from each other. The compartments may be sealed or unsealed. The compartments may be water tight. The chassis 12 may include two or more, three or more, four or more, eight or more, or even ten or more compartments. For example, the chassis 12 may be segmented into at least two compartments, with a first compartment housing at least a first axle and a second compartment housing at least a second axle. The chassis 12 may be divided so that the steering system 36 connected with the front axles is the width of the chassis 12 and is further divided to place each of the wheels 18 in a separate wheel chamber. One of the compartments of the chassis 12 may house one or more electric motors 24. In one example, the OTV 10 has two electric motors 24, each of the electric motors 24 may be in a separate chamber of the compartment.

The OTV 10 may include a cover 20. The cover 20 may function to protect the control systems of the test vehicle 10. The cover 20 may function to allow a vehicle 90 ride over the top of the test vehicle 10. The cover 20 may be removably attached to the chassis 12 of the test vehicle 10. The cover 20 may include one or more through holes for locating one or more batteries 82 in the test vehicle 10. The cover 20 may include one or more vents, one or more handles, one or more locks, or a combination thereof. The cover 20 may be made of steel, composite material, plastic, or a combination thereof. The cover 20 may be made of the same material as the frame 12, the ramps 22, or both. The cover 20 may be made of a different material as the frame 12, the ramps 22, or both. The cover may be located on the same plane as a top portion of the plurality of ramps 22.

The OTV 10 includes one or more batteries 82. The one or more batteries 82 may function to provide power to test vehicle 10. The test vehicle 10 may have one or more, two or more, three or more, four or more, or even a plurality of batteries 82. The one or more batteries 82 may be removably connected with the test vehicle 10. The one or more batteries may be located in one or more compartments of the OTV 10. The one or more batteries 82 may be flush with the top plane of the cover 20 of the test vehicle 10 when installed in the test vehicle.

The OTV 10 may include a plurality of ramps 22. The chassis 12 may be connected with the plurality of ramps 22. The plurality of ramps 22 may function to assist a vehicle 90 with Advanced Driver Assistant Systems (ADAS) technology run over the test vehicle 10 by allowing the tires of vehicle 90 to climb over the test vehicle 10. The chassis 12 may include one or more, two or more, three or more, four or more, six or more, eight or more, ten or more ramps 22. The ramps 22 may be permanently connected with the chassis 12. The ramps 20 may be removably connected with the chassis 12. A top portion of the plurality of ramps 22 may be flush with the chassis cover 20. The test vehicle 10 may include at least one ramp 22 for each side or portion of the test vehicle 10 so that the test vehicle may be easily overrun on any side.

One of the plurality of sensors located in the OTV 10 may include a ground speed sensor. The ground speed sensor may function to calculate the speed of the chassis 12. The ground speed sensor may be connected with a controller 80 and send the speed measurements, inertial measurements, or both to the controller 80 for processing. The ground speed sensor may be located on or in the controller 80. The ground speed sensor 80 may be further supported by GPS to ascertain the ground speed of the chassis 12.

The OTV 10 includes a steering system 36. The steering system 36 may function to guide the movement of the OTV 10. The steering system 36 may include one or more steering shafts 38, one or more steering knuckles, one or more steering actuators, or a combination thereof. The steering system 36 may be connected with one or more wheels 18, one or more suspension systems (e.g. 40), one or more motors 24, or a combination thereof. In one example, a steering system 36 is disposed in the forward portion 14 of the chassis 12 and connects a right front wheel and a left front wheel with a steering shaft 38, the steering being operatively coupled with a steering actuator, such that when the steering actuator is signaled, the left wheel and the right wheel move in unison to turn the OTV 10.

The chassis 12 is connected with one or more suspension systems 40. A suspension system 40 may function to provide damping to the OTV 10. The suspension system 40 may function to absorb some of the shock of being run over during a test, minimizing damage sustained to the OTV 10. The suspension system 40 may include one or more absorbers and/or dampers. The one or more absorbers may be shocks, struts, springs, or any other suitable damping device. The one or more suspension system 40 may be operatively connected with one or more wheels 18, one or more axles 28, one or more motors 24, one or more steering systems 36, or a combination thereof. For example, a first damper is connected with a first drive axle assembly, and a second damper is connected with a second drive axle assembly so that when the OTV rides over a change in the driving surface, the drive wheels remain planted on the driving surface. In another example, the suspension system 40 absorbs a substantial amount of the impact of a vehicle 90 running over top the test vehicle 10.

The OTV 10 includes one or more motors 24 connected with the chassis 12. The one or more motors 24 may function to provide propulsion to the OTV 10. The one or more motors may function to assist in slowing down or stopping the OTV 10. The one or more motors 24 may be electric motors. The OTV 10 may include one or more, two or more, three or more, four or more, or even a plurality of motors 24. Each motor 24 may include a motor housing and an output shaft. The one or more motors 24 may be a part of the braking system 50, 60. The one or more motors 24 may be connected with a steering system 36, a suspension system 40, one or more power supplies 82, one or more wheels 18, one or more chain drives 26, or a combination thereof. In one example, the OTV 10 includes two motors 24 positioned to the rear 16 of the chassis 12, with one motor 24 connected with each rear wheel 18, so that each rear wheel of the OTV 10 is independently powered.

The one or more motors 24 are controllable by one or more motor parameters. Motor parameters are one or more outputs of the motor which can be commanded by the controller 80. The motor parameters may include a motor speed, a motor torque, or both. The one or more motor parameters may be executed by delivering a specific electric current to the one or more motors 24. For example, when a deceleration is commanded by the controller 80, the one or more motors 24 may receive a commanded current, slowing the OTV 10 down at a desired rate by adjusting the motor speed, motor torque, or both.

The OTV 10 includes a plurality of wheels 18. The wheels may function to move the OTV 10 over a surface. The chassis 12 may include two or more, three or more, four or more, six or more, eight or more, or even ten or more wheels 18. For example, the chassis 12 houses four wheels 18, with two at a forward position 14 and two at a rear position 16. Preferably, each wheel 18 is cylindrical. The each of the plurality of wheels 18 may be connected with one or more motors 24, one or more suspension systems 40, one or more steering systems 36, one or more braking systems 50, 60, one or more drive axles 28, one or more brake axles 54, one or more speed sensors 56, at least one tire, or a combination thereof.

The one or more motors 24 are connected to the one or more wheels 18 through a drive system/drive train 26. The drive system 26 may be a chain drive. The chain drive 26 may function to transfer rotational movement from an output shaft of the motor 24 to power a wheel 18. Each motor 24 may include one or more, two or more, three or more, or even a plurality of chain drives 26. Each chain drive 26 may include a first sprocket 30 on the output shaft of the motor 24 and a second sprocket 32 on a drive axle 28 of the wheel 18. Each chain drive 26 may include at least one means of transmission between the first sprocket 30 and the second sprocket 32. For example, the chain drive may include at least one chain 34. In another example, the chain drive 26 may include at least one belt.

Each of the plurality of wheels 18 may include a tire wrapped around its circumference. The tires may function to provide traction on a surface. The tires may be made natural rubber, synthetic rubber, plastic, fabric, steel, polymers, or a combination thereof. The tires may be inflatable. The tires may be solid. The tires may be a disposable item that may be replaced when worn out.

The test vehicle 10 includes a braking system 50, 60. The braking system 50, 60 may function to slow down or stop the OTV 10. The braking system 50, 60 may include one or more brake rotors 52, one or more brake calipers 58, one or more master cylinders 66 operatively connected with an actuator 68, one or more lines 62 connecting the one or more master cylinders 66 with the one or more brake calipers 58, a pressure sensor 64 in fluid communication with the one or more brake lines 62, the one or more motors 24, or a combination thereof. The braking system 50, 60 may be electronically actuated, mechanically actuate, electromechanically actuated, hydraulically actuated, or a combination thereof. For example, an electric signal from the controller 80 may be received by the actuator 68, causing the actuator 68 to depress the master cylinder 66 a specific distance, forcing hydraulic fluid to pass through the hydraulic block 61 through the brake lines 62 to the brake caliper 58, causing the brake caliper 58 to clamp the brake rotor 52, slowing the rotational speed of wheel 18. In another example, the controller 80 may send an electric signal to the one or more motors 24 to adjust motor speed (e.g. revolutions per minute (RPM) of the output shaft of the electric motor), adjust motor torque, or both, causing the OTV 10 to slow down or stop. In a further example, the braking system 50, 60 may utilize the controller 80 to actuate the master cylinder 66 and adjust the motor speed, torque, or both, slowing down the OTV 10 without causing a wheel slip condition.

The brake system 50, 60 includes one or more brake rotors 52. The one or more brake rotors 52 may function to receive a force applied by one or more brake calipers 58. The brake system 50, 60 may include one or more, two or more, three or more, four or more, six or more, or even a plurality of brake rotors 52. The one or more brake rotors 52 may be connected with at least one of the plurality of wheels 18. The one or more brake rotors 52 may be directly or indirectly connected with the at least one of the plurality wheels 18. For example, the brake rotor 52 may be indirectly connected to the at least one wheel 18 by a brake axle 54. The one or more brake rotors 52 may be clamped by a brake caliper 58. For example, when a clamping force is applied to the one or more brake rotors 52, the one or more brake rotors 52 may slow the rotational speed of the brake axle 54 and the wheel 18 connected therewith.

The one or more rotors 52 are connected with a brake axle 54. The brake axle 54 may function to rotatably connect a wheel 18 with one or more brake rotors 52. The chassis 12 of the OTV 10 may include one or more, two or more, three or more, or a plurality of brake axles 54. Each brake axle 54 may connect one or more, two or more, three or more, four or more, or even a plurality of brake rotors 52 with at least one wheel 18 of the OTV 10. For example, the OTV 10 may have one brake axle 54 with two brake rotors 52 connected to each of the front wheels 18, so that each wheel is rotatably connected with two brake rotors 52. Each brake axle 54 may include a rotational speed sensor 56 to sense the rotational speed of the brake axle 54 and the wheel 18.

The brake axle 54 may include a rotational speed sensor 56. The rotational speed sensor 56 may function to determine the rotational speed of the brake axle 54 and connected wheel 18. The rotational speed sensor 56 may communicate the sensed rotational speed to a controller 80 for analysis.

The brake system 50, 60 includes one or more brake calipers 58. The one or more brake calipers 58 may function to provide a clamping force against the one or more brake rotors 52 in order to reduce rotational speed of the plurality of wheels 18. Each of the one or more brake rotors 52 has a corresponding brake caliper 58. Each of the one or more brake calipers 58 may include two brake pads. The brake system 50, 60 may include one or more, two or more, three or more, four or more, six or more or even a plurality of brake calipers 58. The one or more brake calipers 58 may be fluidly connected by one or more brake lines 62 to a master cylinder 66.

The braking system 50, 60 includes a master cylinder 66. The master cylinder 66 may function to convert a directional force into hydraulic pressure. The master cylinder 66 may include a piston and a bore. The braking system 50, 60 may include one or more, two or more, three or more, or even four or more master cylinders 66. The master cylinder 66 may be fluidly coupled with a hydraulic fluid reservoir 72. The master cylinder 66 may be in fluid communication with one or more brake lines 62, a hydraulic distribution block 61, a pressure sensor 64, the one or more brake calipers 58, or a combination thereof. The master cylinder 66 may be actuated by an actuator 68. For example, the actuator 68 may depress the piston within the master cylinder, creating hydraulic pressure which closes the one or more brake calipers 58.

The braking system 50, 60 includes a brake actuator 68. The brake actuator 68 may function to engage the master cylinder 66. The brake actuator 68 may be in direct connection with the master cylinder 66. The brake actuator 68 may be connected to the master cylinder 66 through a connecting rod 70. The brake actuator 68 may be a mechanical actuator, an electric actuator, an electromechanical actuator, or a combination thereof. For example, the brake actuator 68 is a linear electric actuator which receives electrical signals from a controller 80, the pressure sensor 64, or both to engage the master cylinder 66 a calculated distance. Additionally, the brake actuator may also be controlled by the pressure needed, not only by the stroke. The linear electric actuator 68 moves the master cylinder 66 piston the specific calculated distance which creates a predetermined amount of hydraulic pressure. The hydraulic pressure translates into a specific clamping force that the one or more brake calipers 58 apply to the one or more brake rotors 52.

The braking system 50, 60 includes a hydraulic distribution block 61. The hydraulic distribution block 61 may function to distribute hydraulic fluid to two or more locations. For example, the master cylinder 66 is connected to an input of the distribution block 61 and two brake lines 62 are connected on an outlet side of the distribution block, so that when the master cylinder 66 is actuated, the hydraulic pressure is distributed through two brake lines 62 evenly. The hydraulic distribution block 61 may include one or more, two or more, three or more, four or more, or even a plurality of inlets. The hydraulic distribution block 61 may include two or more, three or more, four or more, or even a plurality of outlets. The two or more outlets may be connected with one or more brake lines 62, one or more pressure sensors 64, or a combination thereof.

The braking system may include one or more pressure sensors 64. The one or more pressure sensors 64 may function to monitor the amount of hydraulic pressure is being applied by the master cylinder 66. The one or more pressure sensors 64 may further function to send the value of the hydraulic pressure within the braking system 50, 60 to a controller 80.

The braking system 50, 60 includes a controller 80. The controller 80 may function to control the amount of braking force applied to the wheels 18 of the OTV 10. The controller 80 may receive data from the plurality of sensors (e.g. ground speed sensor, rotational speed sensor 56, pressure sensor 64, motor 24). The controller 80 may calculate a wheel slip threshold based on the data received from the plurality of sensors. The controller 80 may look up in a database or library the optimum amount of wheel torque that can be applied through the braking system 50, 60 based on the sensor data. The controller 80 may include an algorithm which optimizes braking without causing a wheel slip condition. The controller 80 may send commands to the brake actuator 68, the one or more motors 24, or both to slow the OTV down without creating a wheel slip condition. The controller 80 may distribute the braking force between the braking system 50, 60 and the one or more motors 24 to optimize braking performance.

In one example, the OTV 10 may be traveling at a testing speed. The controller 80 receives data from the plurality of sensors, such as the one or more rotational speed sensors 56 and at least one ground speed sensor. The controller 80 calculates a standardized difference between rotational wheel speed (in conjunction with a pre-calibrated wheel and tire diameter) and chassis speed (ground speed) to determine a wheel slip threshold. Once the controller 80 has calculated the wheel slip threshold based on the pre-calibrated wheel height, the rotational speed of the wheels, and the chassis ground speed, the controller 80 may look up in a database a corresponding actuator value. The actuator value may be a specific movement distance which will create a specific amount of hydraulic pressure when the master cylinder 66 is moved. The controller 80 then sends the actuator value to the brake actuator 68. The brake actuator 68 receives the value from the controller 80 and moves the master cylinder 66 the specific distance, creating the optimal force for braking relative to the wheel slip threshold through the hydraulic braking system 50, 60. The optimal force is applied through the one or more brake calipers 58 as a clamping pressure (determined by the calculated distance of movement of the master cylinder 66 by the actuator 68) onto the one or more brake rotors 52 to slow the OTV 10 without causing a wheel slip condition.

In another example, the controller 80 receives the one or more motor parameters from the one or more motors 24, in addition to the wheel speed from the one or more rotation speed sensors 56, and the ground speed from the at least one ground speed sensor. The controller 80 analyzes the motor parameter, the rotational speed of the wheels, and the ground speed, and then calculates the standardized difference between rotational wheel speed and chassis speed to determine the wheel slip threshold. Once the controller 80 has calculated the wheel slip threshold based on the pre-calibrated wheel height and/or wheel circumference, the rotational speed of the wheels 18, the chassis ground speed, and the one or more electric motor parameters, the controller 80 may determine a corresponding actuator value and a corresponding motor parameter for optimum braking. The actuator value may be a specific movement distance which will create a specific amount of hydraulic pressure when the master cylinder 66 is moved, creating a first braking force. The motor parameter value may be a specific motor speed or torque which the motor 24 applies to slow the OTV 10 down, causing a second braking force. The hydraulic braking system and the electric motors work in conjunction to slow down or stop the OTV without causing a wheel slip condition. The controller 80 simultaneously sends the actuator value to the brake actuator 68 and commands the corresponding motor parameter from the one or more motors 24. The brake actuator 68 receives the value from the controller 80 and moves the master cylinder 66 the specific distance, applying the calculated force through the one or more brake calipers 58 as a clamping pressure onto the one or more brake rotors 52 and the one or more motors 24 adjust the motor output (e.g. torque, rotational speed, or both), creating the optimal force for braking relative to the wheel slip threshold optimally slowing the OTV 10 without causing a wheel slip condition.

FIG. 1 is a perspective view of the OTV 10 holding a target object 92 being struck by vehicle 90 during a test.

Figure 2:
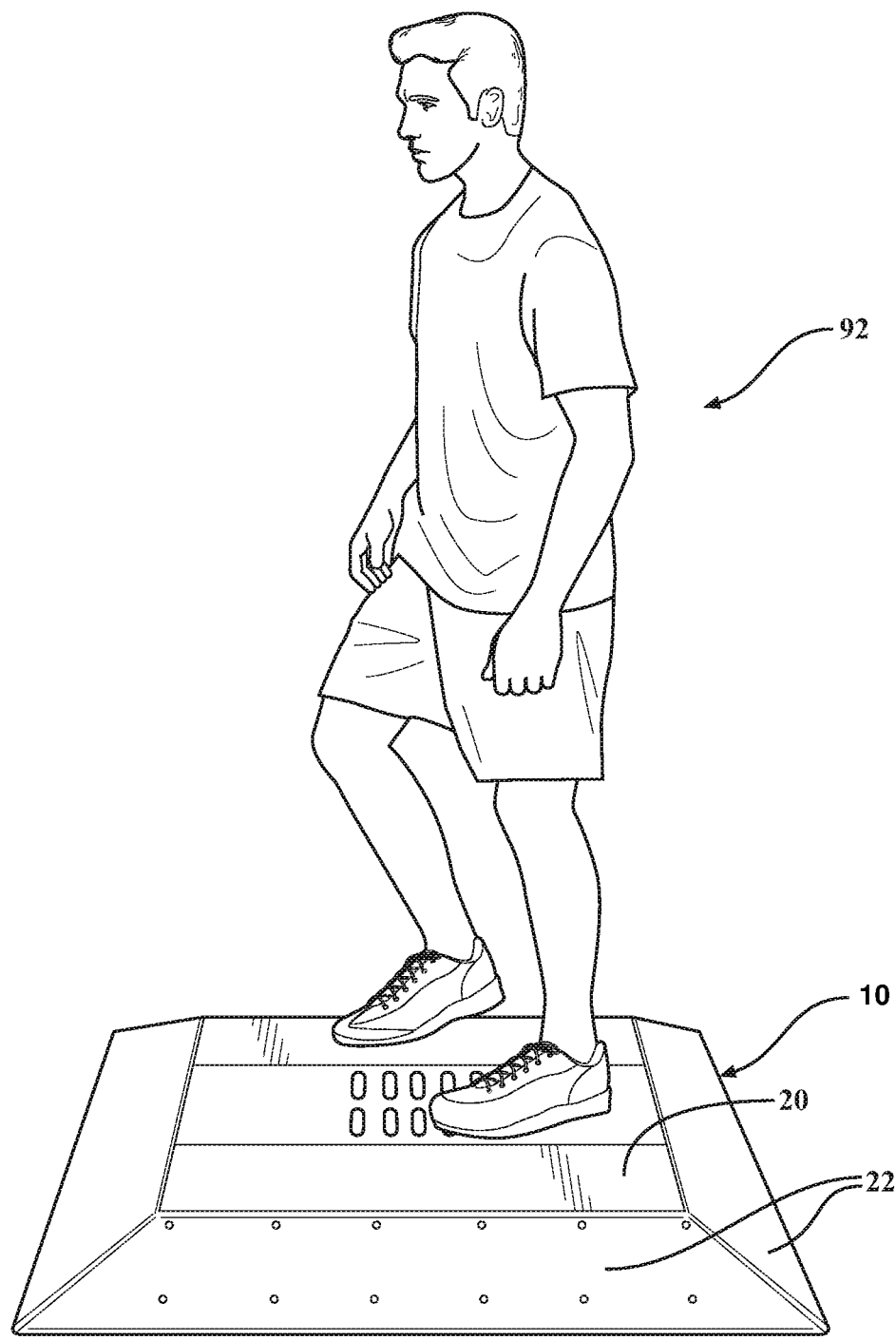
FIG. 2 is a perspective view of a test vehicle and soft target.

FIG. 2 is a perspective view of OTV 10 holding a target object 92 shaped like a pedestrian. The OTV is shown with cover 20 and ramps 22.

Figure 3A:
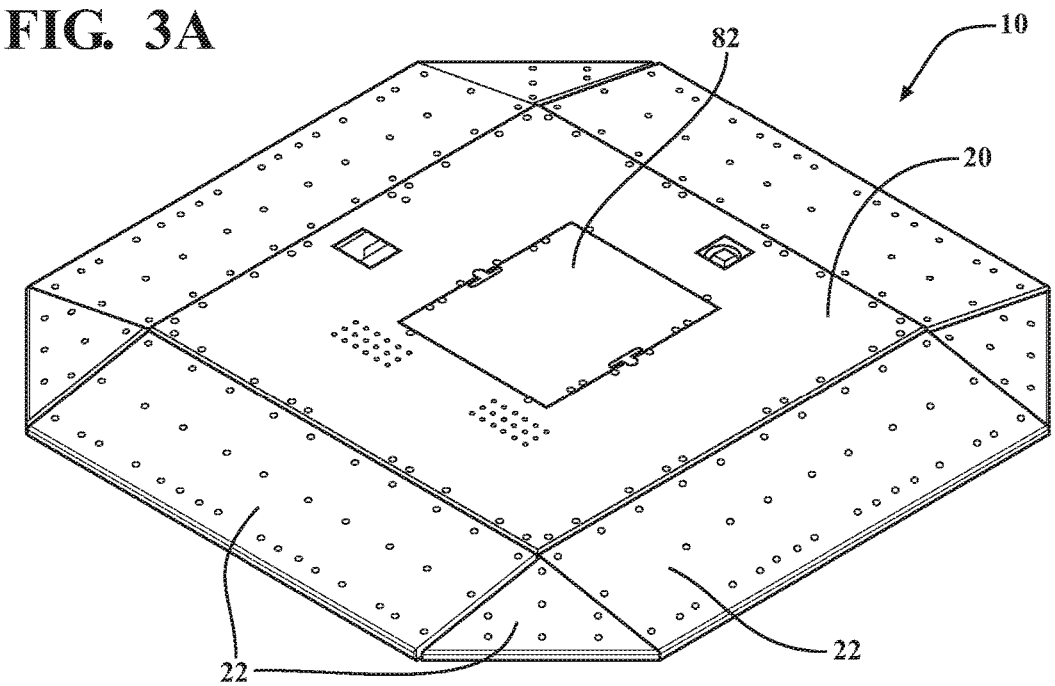
FIG. 3A illustrates a test vehicle consistent with the teachings herewith.
Figure 3B:
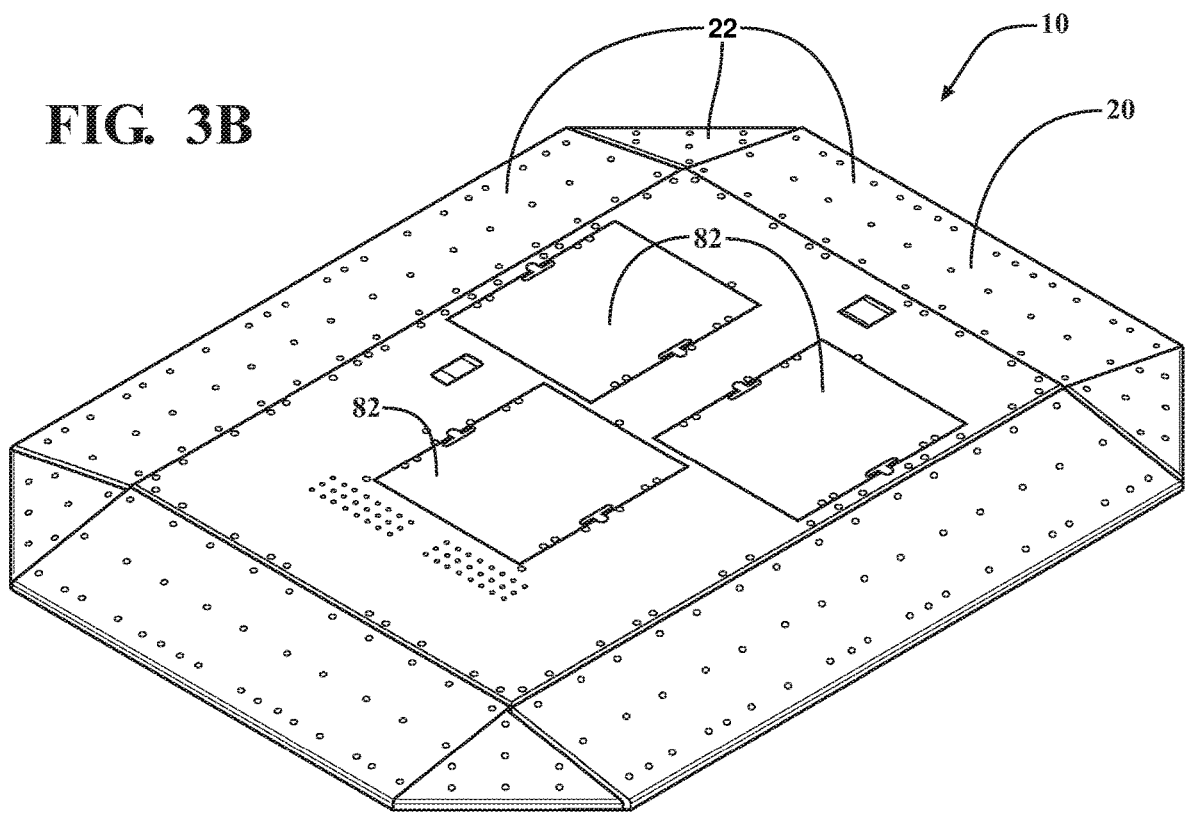
FIG. 3B illustrates a test vehicle consistent with the teachings herewith.

FIGS. 3A and 3B are perspective views of OTVs 10 consistent with the teachings herewith. The OTV is shown with cover 20 and ramps 22. Disposed within the chassis through the cover 20 are batteries 82.

Figure 4:
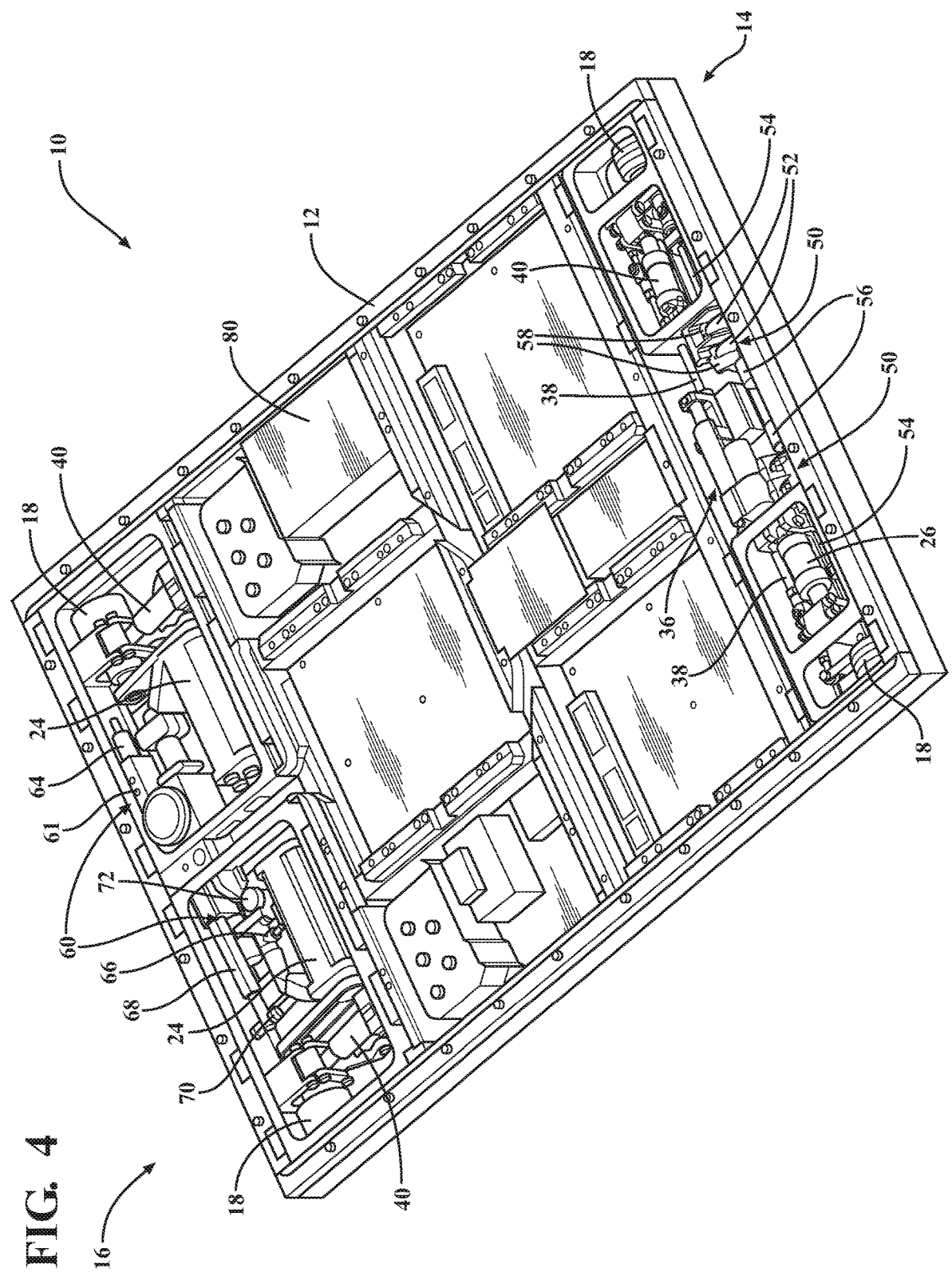
FIG. 4 is a perspective view of a test vehicle with the cover removed.

FIG. 4 is a perspective view of a OTV 10. The OTV includes a frame 12 with wheels 18. The OTV has a forward portion 14 and a rear portion 16. Looking to the forward portion 14, the OTV 10 includes a steering system 36 connecting to wheels 18 through steering shafts 38. The wheels 18 are connected with dampers 40 and brake axles 54. The brake axles 54 are coupled with brake rotors 52 and rotational speed sensors 56. Calipers 58 engage with brake rotors 52 when the OTV 10 is signaled to slow down or stop. Moving to the rear portion 16, motors 24 are connected to wheels 18 through chain drive 26. Chain drive 26 includes a first sprocket 30 on the output of motor 24 and a second sprocket 32 connected with the drive axle 28. The drive axle 28 connects with wheel 18. The rear portion of the brake assembly 60 includes the master cylinder 66 which is fluidly connected to the fluid reservoir 72 and the distribution block 61 through the brake lines 62. The pressure sensor 64 is located in the distribution block 61. The master cylinder 66 is connected to the electric brake actuator 68 with the actuator rod 70. When the brake actuator 68 is operated, the master cylinder 66 turns linear movement into hydraulic pressure which is used to close the brake calipers 58 onto the brake rotors 52.

Figure 5A:
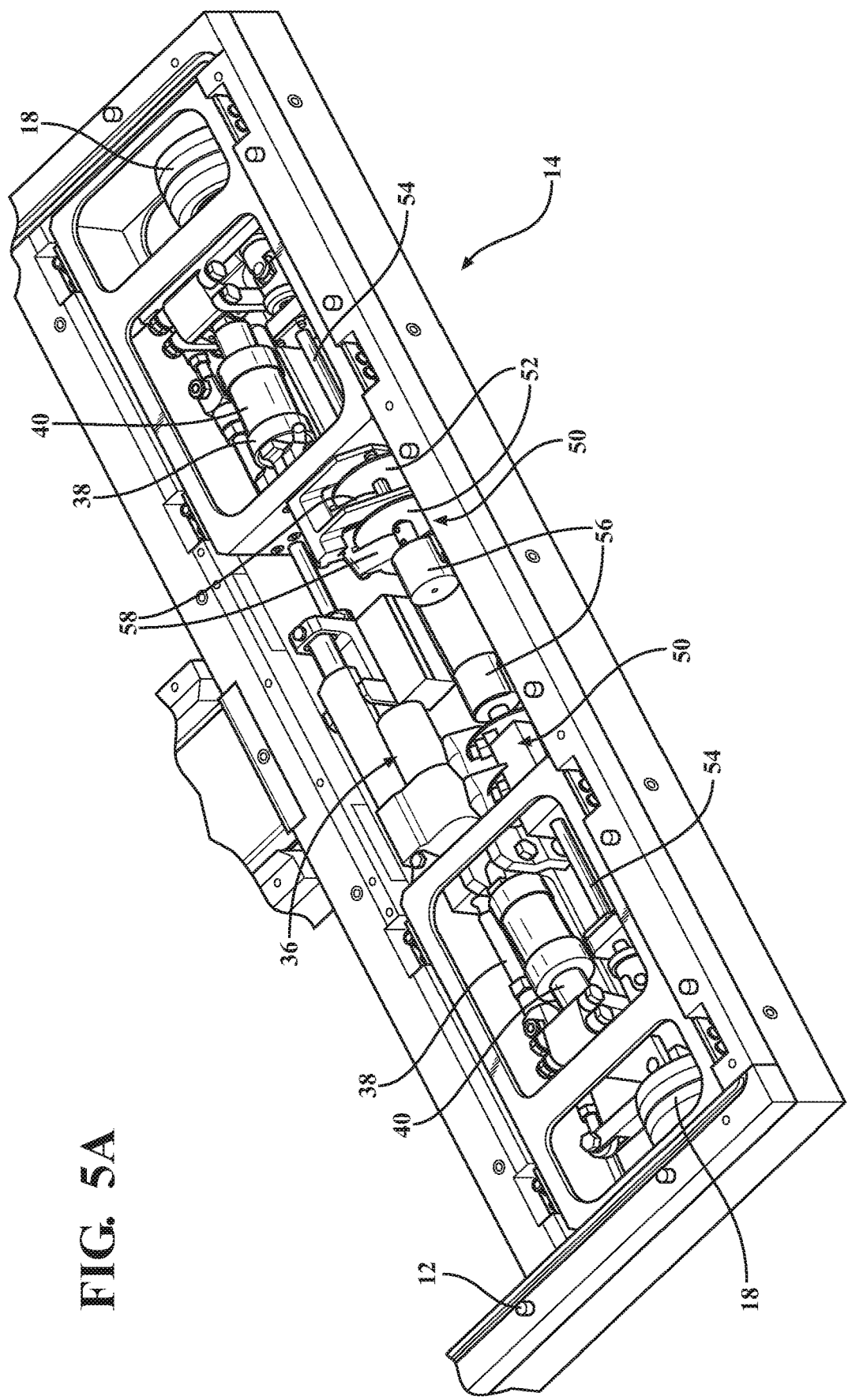
FIG. 5A illustrates a front portion of a braking system located in a test vehicle.
Figure 5B:
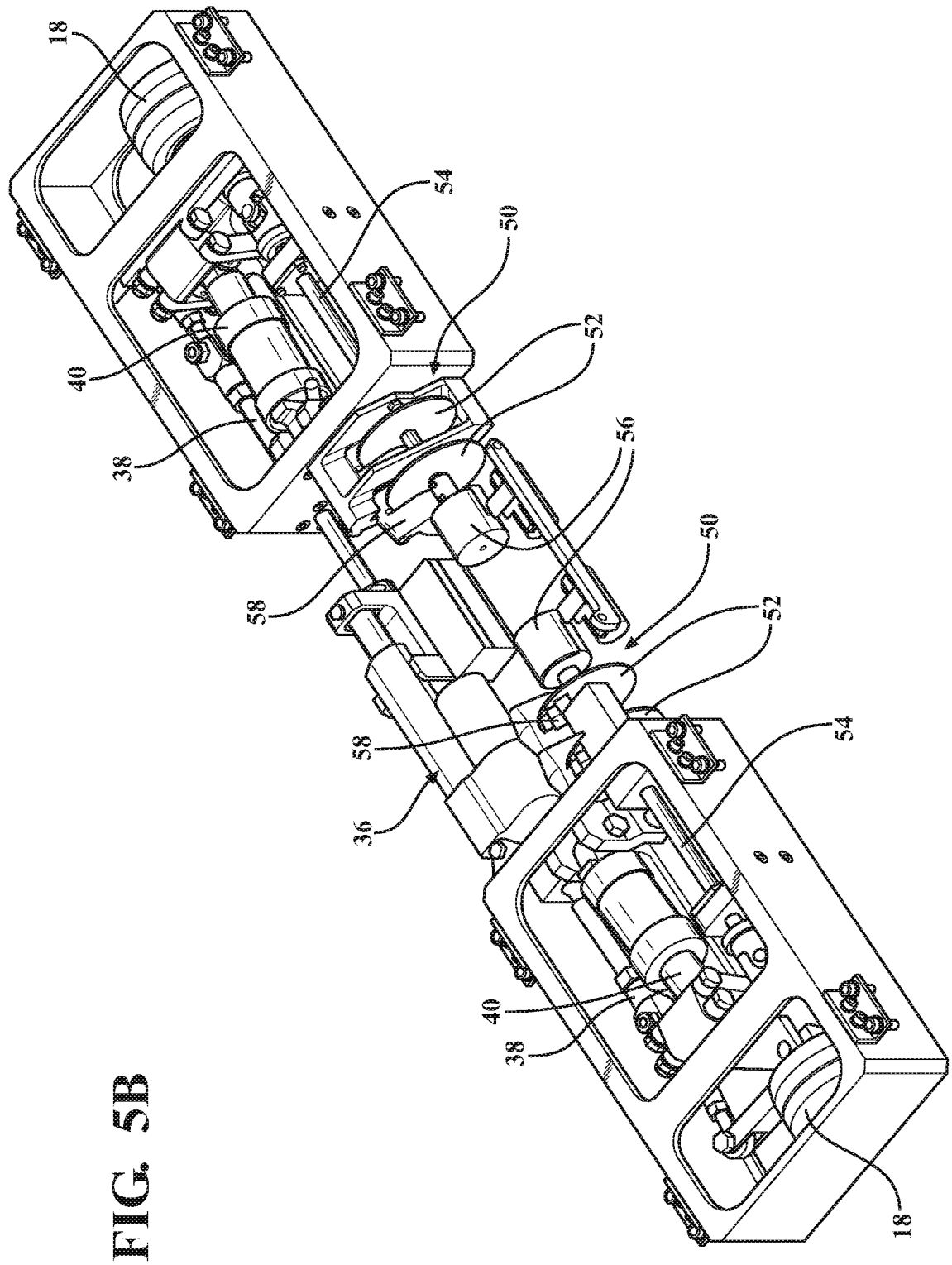
FIG. 5B illustrates a front portion of a test vehicle without a frame.

FIGS. 5A and 5B show the front portion 14 of OTV 10 including steering system 36 and the front portion of the braking system 50. As shown in FIG. 1, the steering system 36 is connected to wheels 18 through steering shafts 38. The wheels 18 are further connected with dampers 40 and brake axles 54. The brake axles 54 are coupled with brake rotors 52, so when brake calipers 58 receive hydraulic pressure generated by master cylinder 66, the brake calipers 58 clamp onto brake rotors 52, decreasing the rotational speed of the brake axle 54 and wheel 18. The rotational speed sensor 56 rides on brake axle 54 and reports the rotational speed of the brake axle 54 and wheel 18 to controller 80. Controller 80 processes the information from the rotational speed sensors 56 as well as ground speed data from a ground speed sensor (not shown) to calculate the standardized difference between rotational speed of the wheels 18 and the speed of the chassis 12 (e.g. wheel slip). Once the controller 80 has determined the wheel slip threshold, controller 80 sends a signal to brake actuator 68 to move the master cylinder 66 a specific distant, creating a corresponding hydraulic pressure. The hydraulic pressure is passed through the distribution block 61 to the brake calipers 58 via brake lines 62, the brake calipers 58 converting the hydraulic pressure into clamping force on the brake rotors 52, slowing the rotational movement of brake axle 54 and wheel 18 without causing a wheel slip condition.

Figure 6:
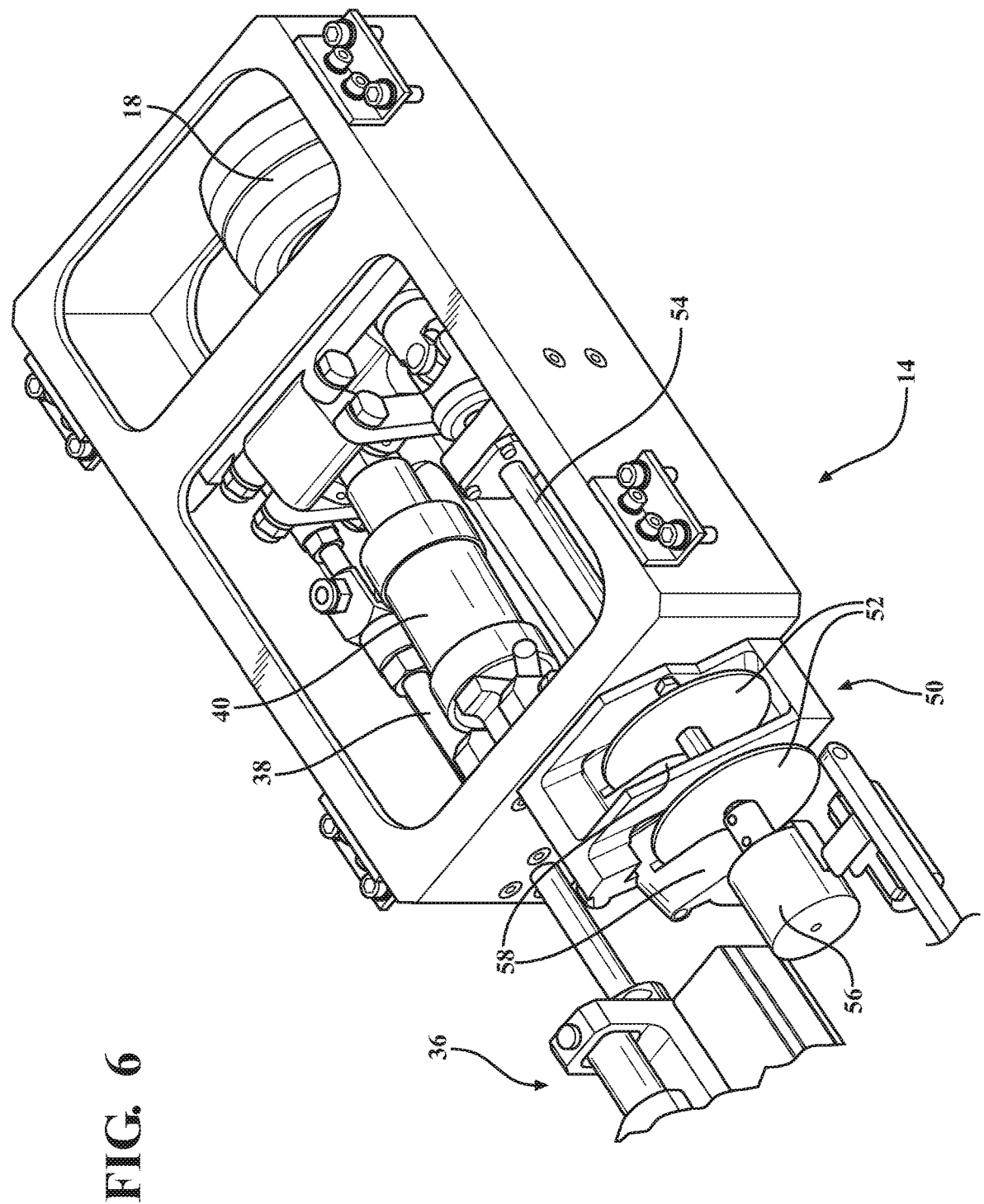
FIG. 6 illustrates a front portion of a test vehicle.
Figure 7:
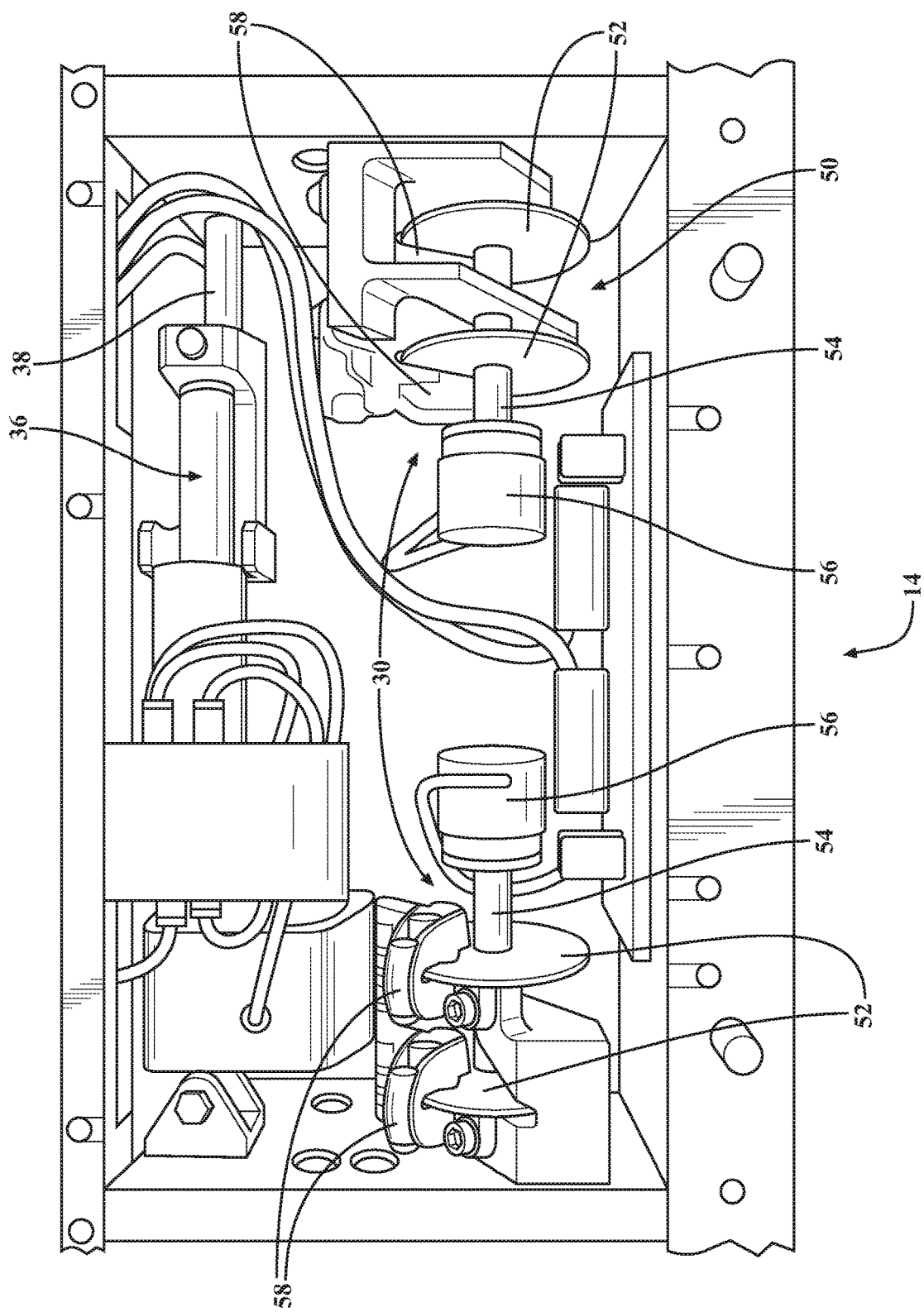
FIG. 7 illustrates a front portion of a test vehicle.
Figure 8:
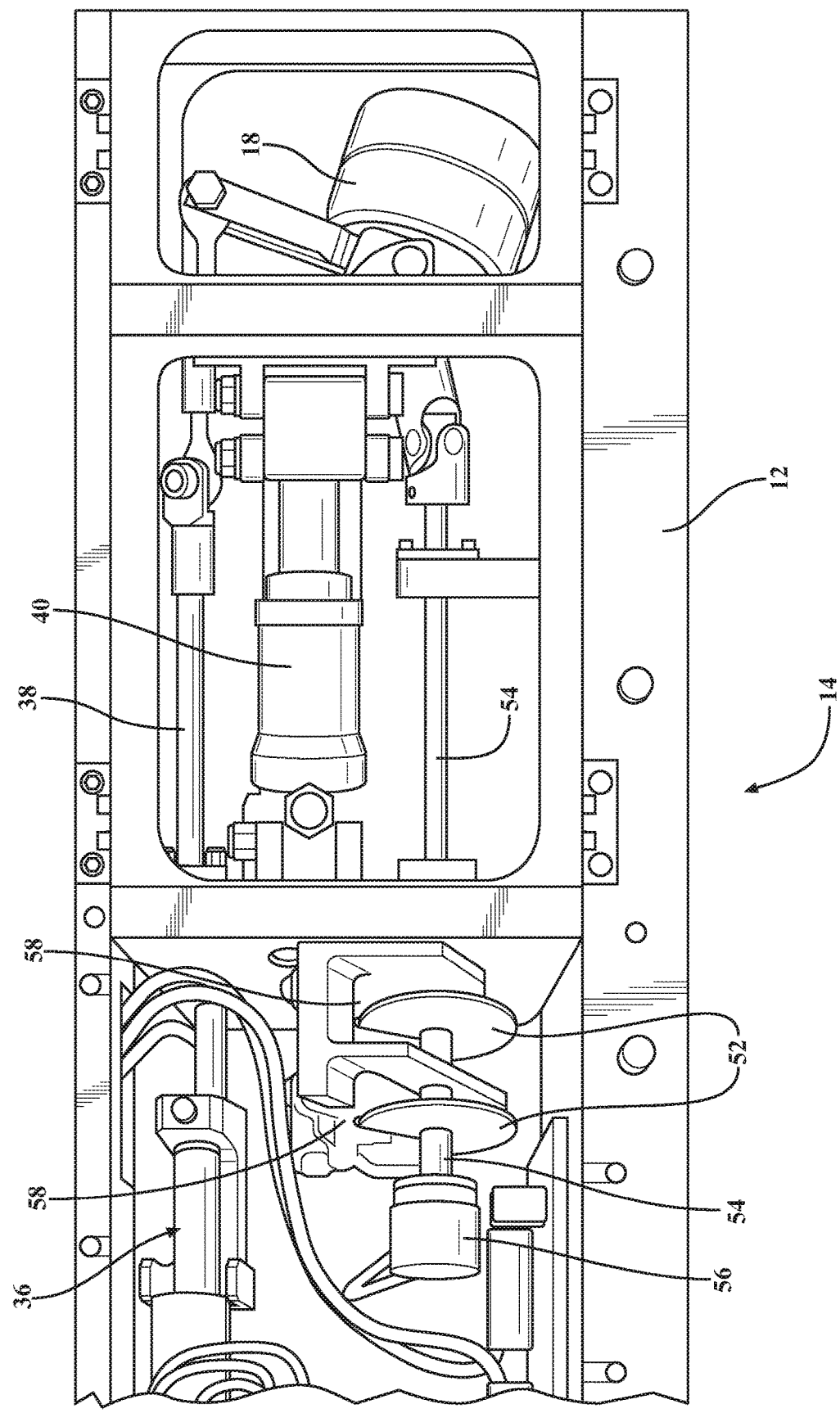
FIG. 8 illustrates a front portion of a test vehicle.

FIGS. 6, 7, and 8 illustrates an example of a steering system 36 and a front portion of braking system 50. The front portion of the braking system 50 includes the brake calipers 58, brake rotors 52, and brake axles 54. The front portion of the braking system 50 is separated from the rear portion of the braking system 60 which includes the hydraulic actuation components (e.g. master cylinder 66, distribution block 61, brake actuator 68) to for packaging to allow the OTV to maintain its ultra-low profile while maintaining sufficient performance.

Figure 9:
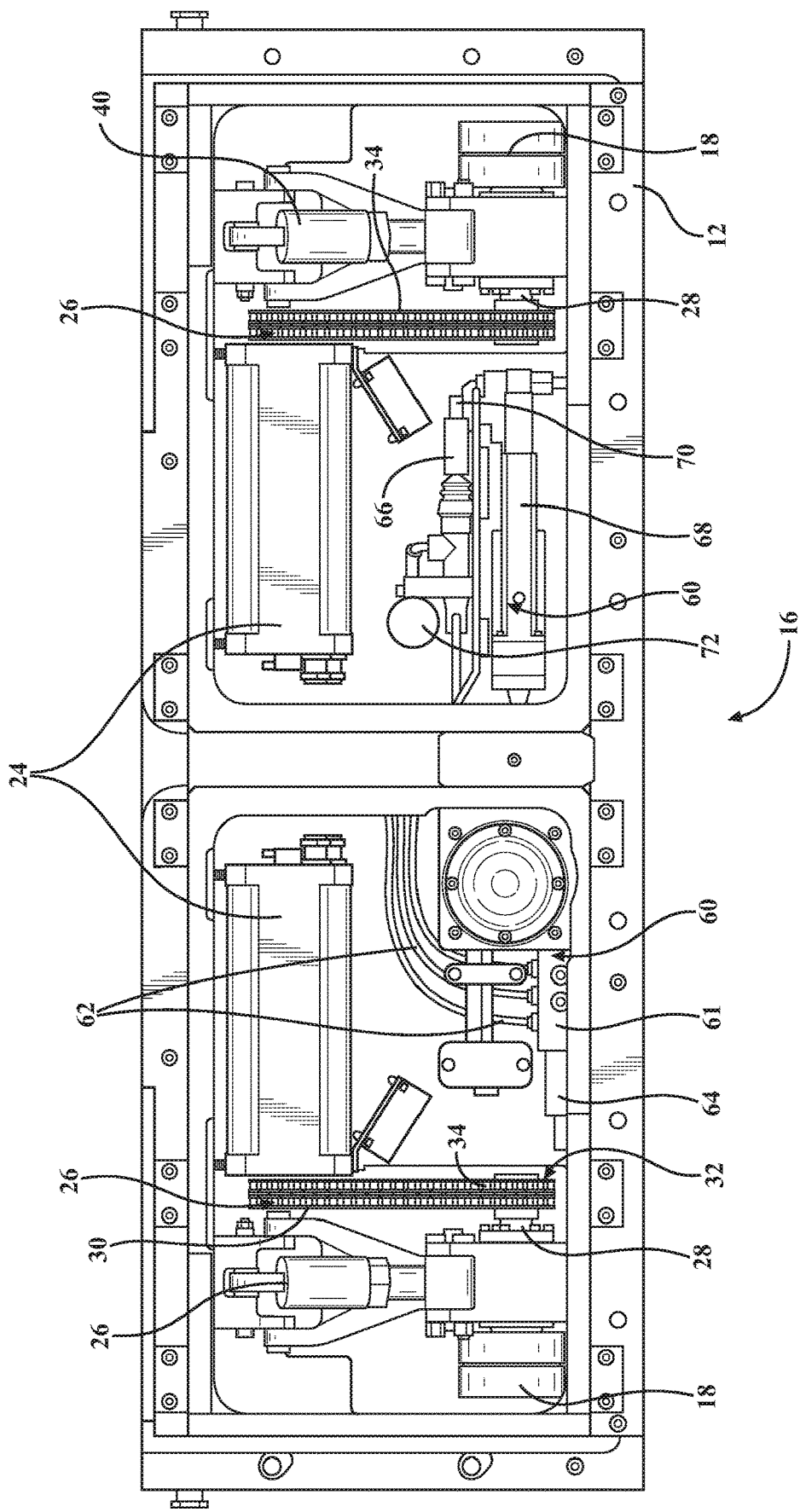
FIG. 9 illustrates an example of a rear drive mechanism and a portion of a braking system.

FIG. 9 illustrates the rear portion 16 of the OTV 10 including the rear drive mechanism (motors 24, chain drive 26) and a portion of a braking system 60 (e.g. master cylinder 66, distribution block 61, brake actuator 68). Motors 24 are connected to wheels 18 through chain drive 26. Chain drive 26 includes a first sprocket 30 on the output of motor 24 and a second sprocket 32 connected with the drive axle 28. The drive axle 28 connects with wheel 18. The motors 24 are also in communication with the controller 80. The controller 80 sends and receives information about the motors 24 and adjusts each motor's 24 output (e.g. motor RPM) depending on the conditions.

Figure 10:
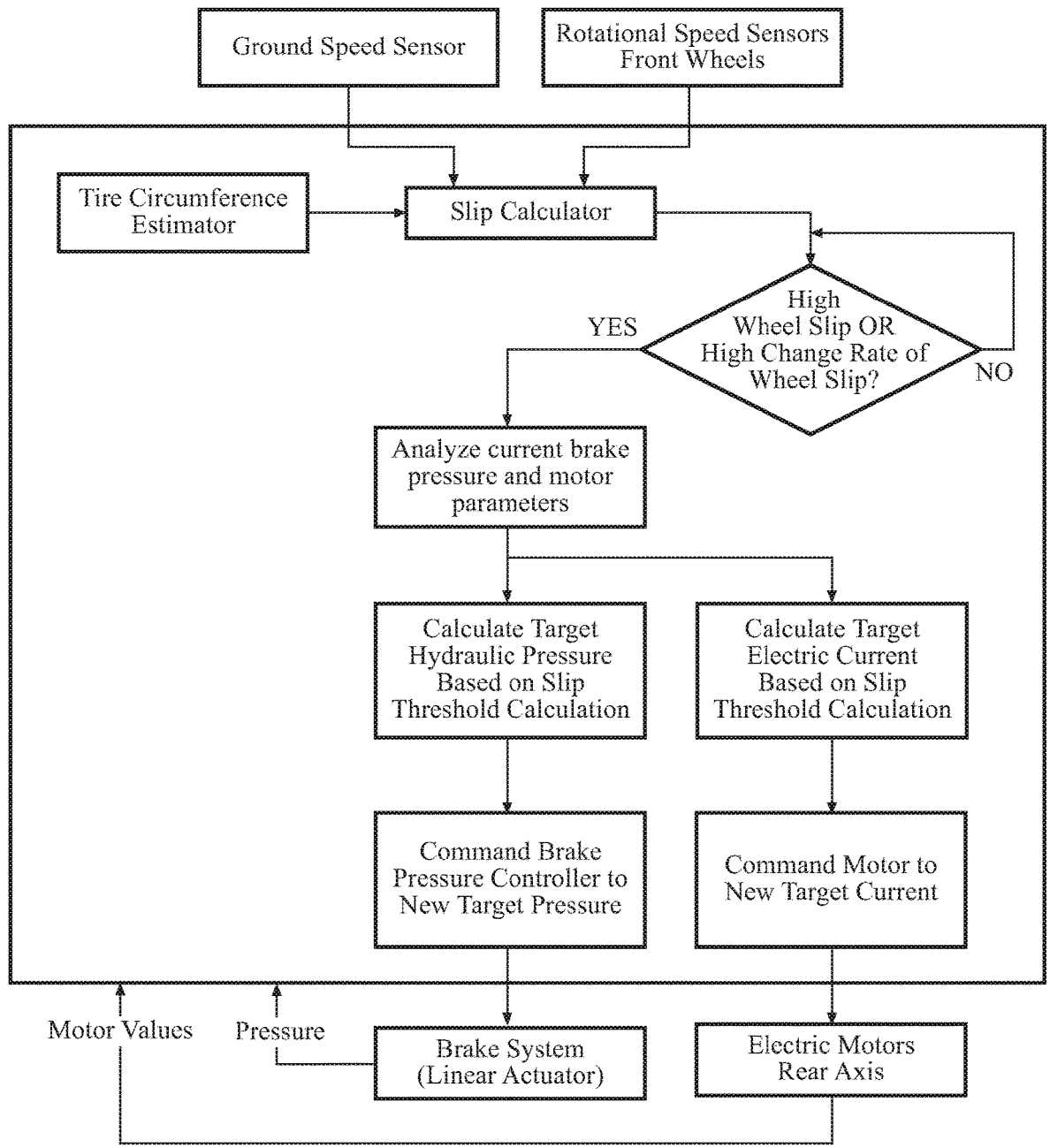
FIG. 10 is a block diagram of the braking control system.

FIG. 10 illustrates a block diagram of the control system showing an example process of controlling the braking of the OTV. The ground speed sensor and the rotational speed sensor(s) feed into the controller. The controller processes the ground speed of the OTV and the rotational speed of at least one axle with the circumference of the tire to calculate a wheel slip threshold. When the wheel slip threshold is calculated, the controller then determines whether there is a high a mount of slip or high change rate of wheel slip. If there is not a high amount of slip or high change rate of wheel slip, the controller continues to monitor until there is a wheel slip condition. Once a wheel slip condition is recognized, the controller analyzes the brake pressure that is currently commanded and compares that to a target hydraulic pressure which is below the wheel slip threshold. The controller then sends a command signal to the hydraulic brake system to adjust the brake pressure to the desired pressure. As the controller is calculating and sending a target brake pressure to the hydraulic brake system, the controller is also monitoring and controlling the one or more electric motors. The controller analyzes the motor parameters of the electric motor and calculates a target electric current (target motor output) to adjust the one or more motor parameters that is lower than the wheel slip threshold. The controller then sends the target electric current to the one or more electric motors. The hydraulic braking system and the electric motors apply the target hydraulic pressure and the target electric current, simultaneously, causing the OTV to decelerate without the wheels entering into a slip condition.

Figure 11:
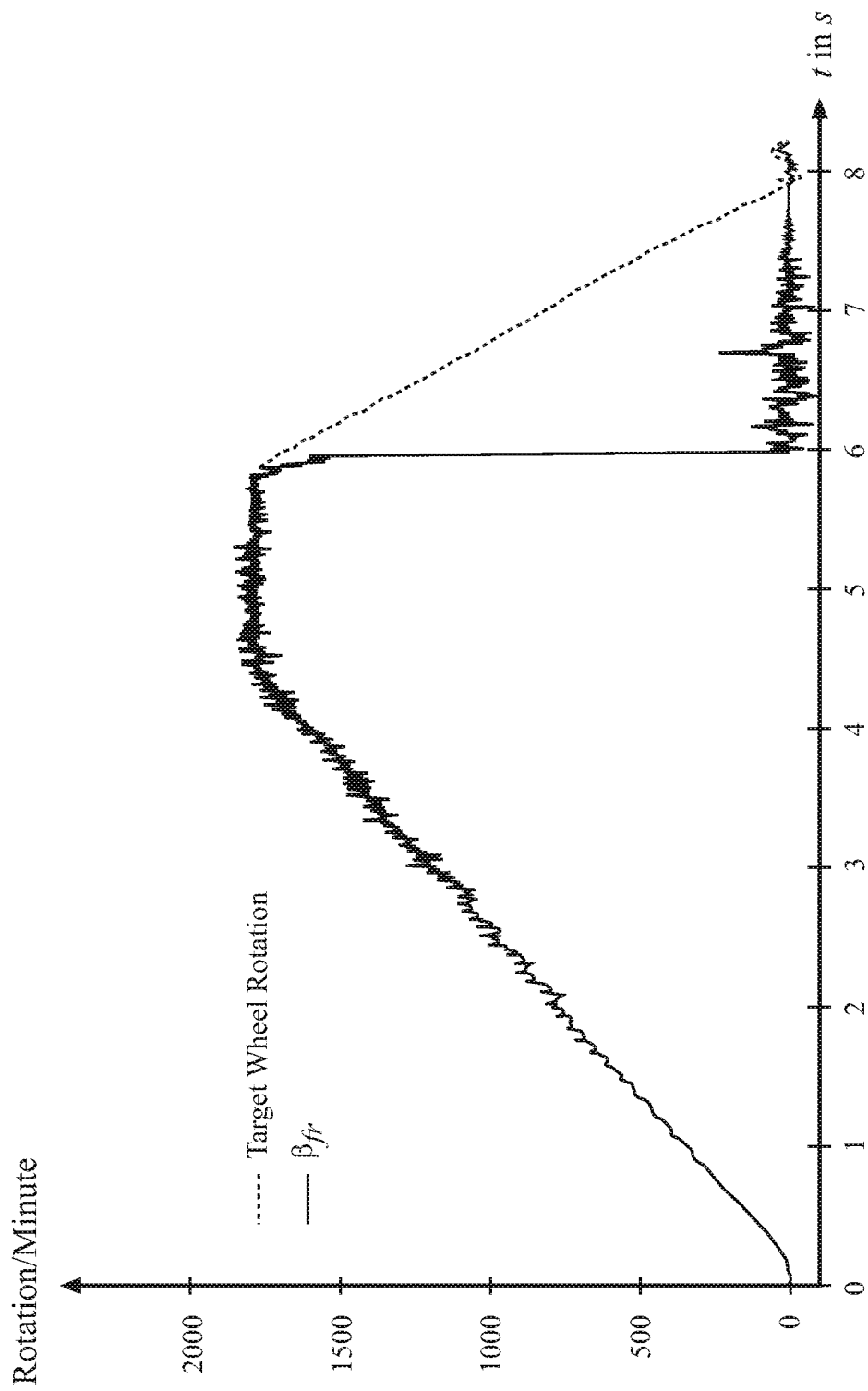
FIG. 11 is a graphic representation of decelerating the OTV with only the hydraulic brake system.

FIG. 11 shows an example of an OTV stopping without the anti-slip braking system consistent with the teachings herewith. The chart shows a wheel rotation (rotations per minute) affected by applying a braking force. The graph depicts a sharp fall in wheel rotation indicating that the wheel is locked and slipping when the hydraulic brake system is only used. The graph gives a desired rotation during a deceleration scenario so as the OTV maintains control and does not enter into a wheel slip condition.

Figure 12:
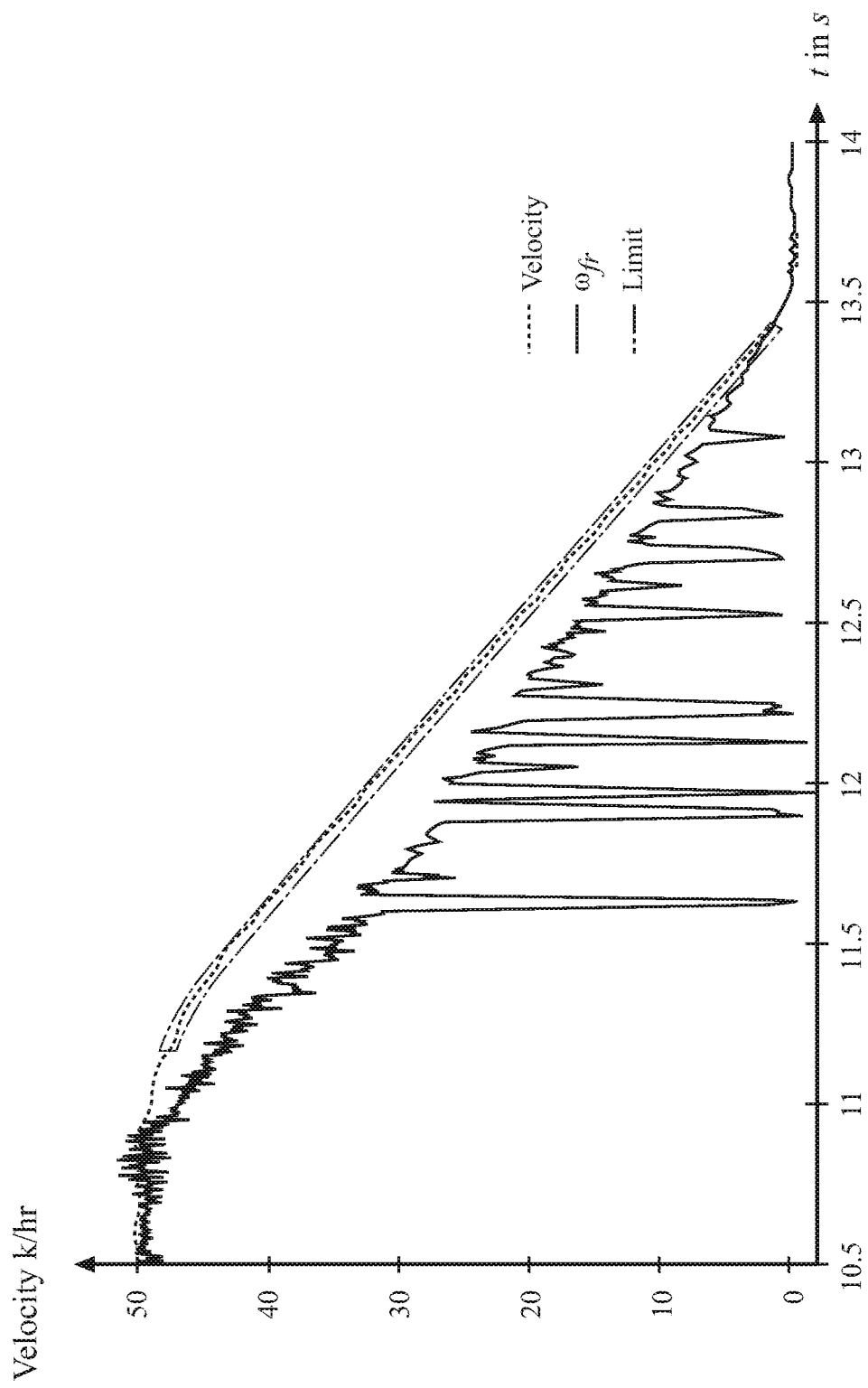
FIG. 12 is a graphic representation of decelerating the OTV with the anti-slip braking system consistent with the teachings herewith.

FIG. 12 shows a graphical representation when the anti-slip braking utilizing both the hydraulic braking system and the electric motors to decelerate the OTV. In contrast to FIG. 11, the graph of FIG. 12 does not have a sharp drop, indicating there is no wheel slip condition present when both the hydraulic braking system and the one or more electric motors are used to stop the OTV. Rather, the OTV decelerates from a high rate of travel to 0 in a relatively linear progression.

Figure 13:
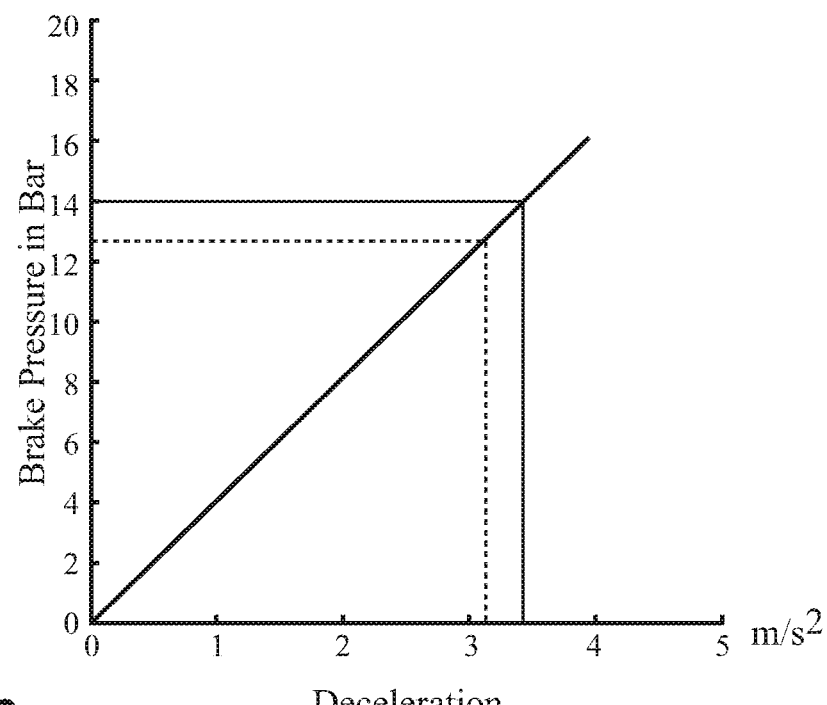
FIGS. 13 and 14 are graphic representations of the range of braking forces commanded by the hydraulic braking system and the electric motors.
Figure 14:
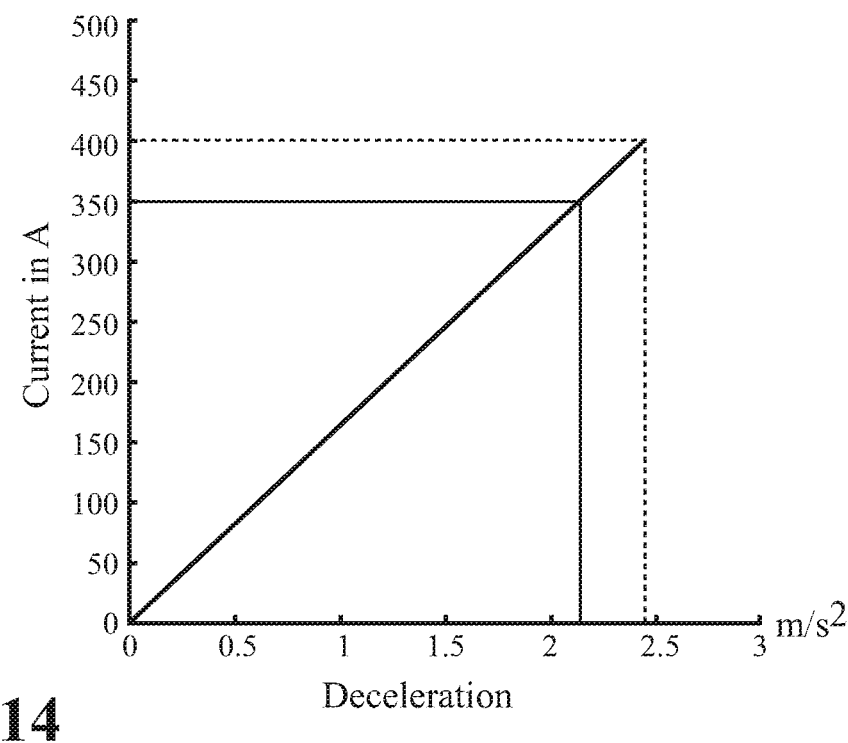

FIGS. 13 and 14 display target braking forces for the hydraulic braking system and the electric motor(s), respectively. FIG. 13 shows one example of a target brake pressure range applied in bar to generate the target stopping force of the hydraulic braking system to prevent a wheel slip condition while decelerating the OTV. FIG. 14 shows one example of a target current range applied in amperes to generate the target stopping force of the electric motor(s) to prevent a wheel slip condition while decelerating the OTV. The target stopping forces produced by each of the hydraulic braking system and the electric motors work together to rapidly slow the OTV down without causing the wheels to slide or slip during the rapid deceleration. The controller 80 calculates the ideal ratio between front and rear brake forces based on the center of gravity and a mass of the OTV. In one example, the front braking force is generated by the hydraulic braking system 50, 60 and the rear braking force is generated by the electric motors 24. The controller 80 calculates a first and a second braking force produced by the hydraulic braking system 50, 60 and the electric motors 24, respectively, changing the vertical tire forces during deceleration (e.g. front vertical tire force increasing, rear vertical tire force decreasing with higher deceleration). The controller calculates the optimal amount of force that the front braking system 50, 60 and the rear braking system 24 must apply while balancing the vertical tire force between the front and back wheels.

The invention claimed is:

1. An overrunable test vehicle including an electronically-controlled anti-slip braking system for reducing wheel slip during rapid deceleration, the overrunable vehicle comprising:
 a chassis;
 a first axle and a second axle rotatably supported by the chassis;
 a wheel connected to each of the first and second axles;
 at least one electric motor connected to the first axle;
 a hydraulic braking system partially supported by the chassis and partially coupled to at least the second axle;
 a rotational speed sensor connected to at least one of the first and second axles for determining a rotational speed of the connected axle;
 a ground speed sensor supported by the chassis for determining a ground speed of the chassis; and
 a controller operatively connected with the at least one electric motor, the hydraulic braking system, the rotational speed sensor, and the ground speed sensor, the controller configured to:
 calculate a difference between the rotational speed of the axle and the ground speed of the chassis to determine a slip threshold of the wheels;
 actuate the hydraulic brake system to apply a first stopping force;

control at least one motor parameter of the at least one electric motor to apply a second stopping force;

wherein the first and second stopping forces combined are less than the slip threshold of the wheels such that the chassis rapidly decelerates free of a wheel slip condition.

2. The overrunable vehicle of claim 1, wherein the rotational speed sensor is connected directly to the second axle.

3. The overrunable vehicle of claim 1, wherein a diameter of each wheel is calibrated into the controller so that the controller can calculate wheel speed based on the rotational speed sensor.

4. The overrunable vehicle of claim 1, wherein the hydraulic braking system includes at least one brake rotor mounted to the second axle with a caliper coupled to the chassis.

5. The overrunable vehicle of claim 4, wherein the hydraulic braking system further includes a master cylinder operatively coupled with a brake actuator with the brake actuator actuating the master cylinder to produce the first stopping force applied by the caliper to the brake rotor.

6. The overrunable vehicle of claim 5, wherein the brake actuator is connected to the controller.

7. The overrunable vehicle of claim 6, wherein the hydraulic braking system further includes a pressure sensor connected to the controller, wherein the pressure sensor sends a pressure signal of the first stopping force produced by the master cylinder within the hydraulic brake system to the controller.

8. The overrunable vehicle of claim 4, wherein the second axle, brake caliper, and brake rotor are mounted at one end of the chassis, and the master cylinder and brake actuator are mounted on an opposite end of the chassis.

9. The overrunable vehicle of claim 4, wherein the braking system includes one caliper for each of the rotors.

10. The overrunable vehicle of claim 1, further including a steering system with the second axle connected to the steering system such that the wheels mounted to the second axle are steerable wheels.

11. The overrunable vehicle of claim 1, further including two first axles, and wherein the at least one electric motor is further defined as two electric motors with one electric motor connected to each first axle.

12. The overrunable vehicle of claim 1, further including a drive train connected between the electric motor and the first axle.

13. The overrunable vehicle of claim 12, wherein the drive train includes a suspension system including one or more absorbers.

14. The overrunable vehicle of claim 1, wherein the motor parameter is defined as a rotational speed that the electric motor spins.

15. The overrunable vehicle of claim 1, wherein the motor parameter is defined as a torque that the electric motor produces.

16. The overrunable vehicle of claim 1, wherein the motor parameter is defined as two motor parameters with a first parameter being a rotational speed that the electric motor spins and a second parameter being a torque that the electric motor produces.

17. The overrunable vehicle of claim 1, wherein the chassis includes a suspension system including one or more absorbers.

18. The overrunable vehicle of claim 1, wherein the chassis is segmented into at least two compartments, with a first compartment housing at least the first axle and a second compartment housing at least the second axle.

19. The overrunable vehicle of claim 18, further including a steering system with the second axle connected to the steering system such that the wheels mounted to the second axle are steerable wheels, and wherein the second compartment is a width of the chassis housing the steering system and the steerable wheels.

20. The overrunable vehicle of claim 19, wherein the second compartment is further separated so that each of the steerable wheels is located in a wheel chamber.

21. The overrunable vehicle of claim 18, wherein the electric motor is two electric motors and the first axle is two first axles, each motor and corresponding axle including a drive train connecting the electric motor and the first axle forming a first drive train and a second drive train; and wherein the first compartment is divided into at least two chambers, each chamber housing one of the first drive train and second drivetrain.

22. The overrunable vehicle of claim 18, wherein one or more batteries are located between the first compartment and the second compartment in a third compartment between the first compartment and the second compartment.

23. A method for maintaining control of an overrunable test vehicle during high deceleration with the overrunable test vehicle having an axle, at least one electric motor, a hydraulic braking system, and a controller; the method comprising the steps of:

determining a ground speed of the overrunable test vehicle;

determining a rotational speed of the axle of the overrunable test vehicle;

calculating a wheel slip threshold based on the ground speed and the speed of the axle using the controller;

actuating a hydraulic braking system to apply a first stopping force which is less than the wheel slip threshold; and controlling one or more motor parameters of one or more electric motors using the controller to apply a second stopping force and to adjust speed and torque that is less than the wheel slip threshold; and concurrently applying the first and second stopping forces to decelerate the overrunnable test vehicle free of a wheel slip condition.

24. The method of claim 23, wherein the step of calculating the wheel slip threshold is further defined as calculating a difference between the rotational speed of the axle and the ground speed.

25. The method of claim 23, wherein the hydraulic braking system includes at least one brake rotor mounted to an axle with a caliper coupled to a chassis of the overrunable test vehicle, and a master cylinder operatively coupled with a brake actuator with the brake actuator connected to the controller, and the hydraulic braking system further including a pressure sensor connected to the controller, and further including the step of:

sending a pressure signal from the pressure sensor of the first stopping force produced by the master cylinder within the hydraulic brake system to the controller.

26. The method of claim 25, further including the steps of changing an actuation distance of the brake actuator and changing the stopping force applied through the hydraulic braking system using the controller based on the pressure signal of the stopping force.

* * * * *